April 1, 1952  D. F. RINGE  2,591,198
APPARATUS FOR CLEANING FILTERS
Filed Feb. 16, 1950

Inventor
Donald F. Ringe
By [signature]
Atty.

Patented Apr. 1, 1952

2,591,198

UNITED STATES PATENT OFFICE 2,591,198

APPARATUS FOR CLEANING FILTERS

Donald Frank Ringe, Guildford, England, assignor to Vokes Limited, Guildford, England Application February 16, 1950, Serial No. 144,449
In Great Britain March 8, 1949

7 Claims. (Cl. 183—61)

This invention is designed to facilitate the cleaning of filters in which a reverse flow of the air or other fluid being filtered (hereinafter for convenience referred to as air) through the filter medium is arranged to dislodge material which may have accumulated thereon. It is applicable to filter elements which more or less approximate to circular form in cross section, so that a rotating member on the clean side can be used to force the air through the filter medium.

In the present invention air is supplied under pressure sufficient to entrain some of the air which has already been filtered and the combined flow to cause a rotary member provided with an inclined aperture to circulate across the filter medium as it projects the air through the filter medium from the clean side.

In the preferred forms, the filter element is of the deeply pleated or star-shaped type and the normal air flow is from outside to in. The rotary member takes the form of a hollow vane of approximately the full length of the element mounted on a hollow spindle and provided at its outer edge with an inclined slot, so that the emerging air reacting on the interior of the element readily causes the required auto-rotation when compressed air from a normal compressed air line is connected to a nozzle through which it is blown into an open end of the hollow spindle across a gap open to the interior of the element, so that a proportion of the cleaned air (usually at or below atmospheric pressure) from the interior of the element is entrained with it.

Other parts of the invention are embodied in a preferred form which will now be described with reference to the accompanying drawings in which—

Figure 1:
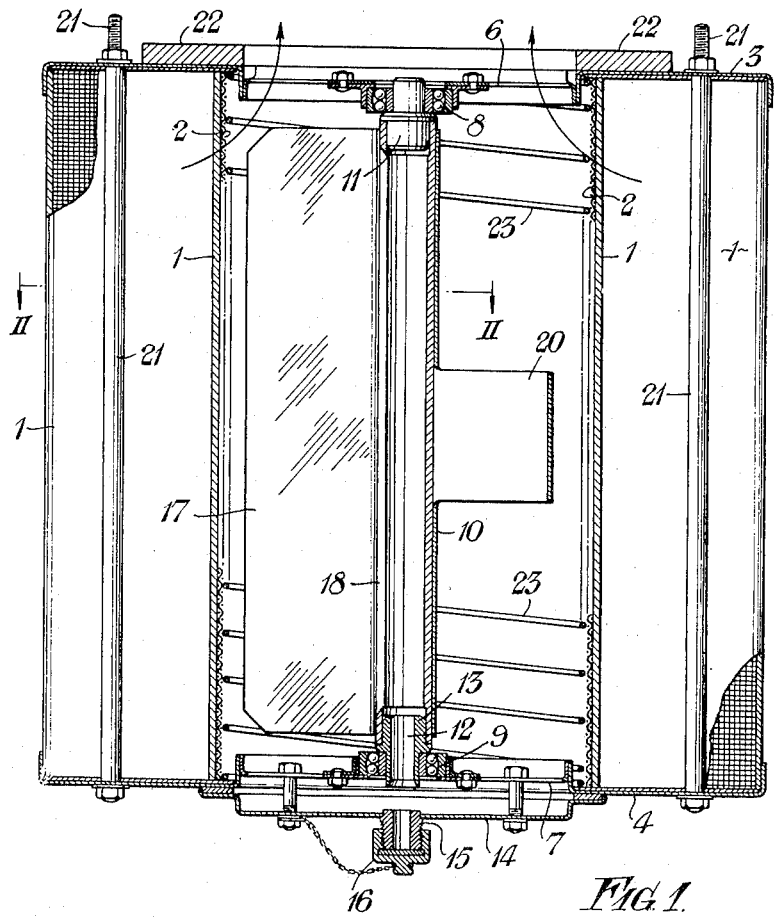
Fig. 1 is a central vertical section of a filter element.
Figure 2:
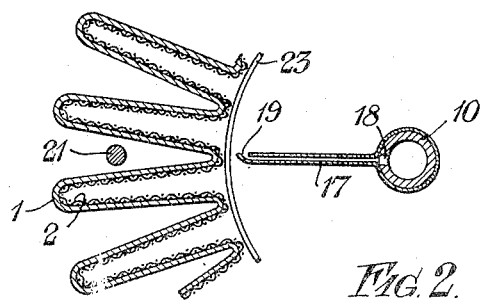
Fig. 2 is a fragmentary section on the line II—II.

The filter is of known type in which the element is of felt or other fabric 1 supported on wire gauze 2 deeply pleated and held between top and bottom end caps 3, 4, respectively. Spiders 6, 7 are supported in the filter by the end caps, said spiders carrying ball bearings 8, 9 of the self-aligning rotating thrust type in which a hollow spindle 10 closed at the top end by a plug 11 and open at the bottom by passage 12 through plug 13 is rotatably mounted. The end caps are preferably annular, the opening in the top cap 3 forming the clean air outlet and the bottom cap being normally closed and comprising a closure cap 14 which carries a compressed air nozzle 15 of smaller bore than the flared opening of passage 12 leading into the hollow spindle and from which the nozzle 15 is suitably spaced. An external cap 16 is provided on the nozzle, replaceable by a connection on a flexible compressed air pipe when it is desired to clean the element. A hollow vane 17 is mounted on the spindle, communicating with its interior by a slot 18 or apertures and running nearly the full length of the element. The outer edge of the vane has an inclined slot 19 which runs close to the inner diameter of the pleated element; a counter balance 20 may be provided opposite to the vane.

A number of such filter units are commonly used in parallel, being secured to a partition plate by nuts on the retaining bolts 21, with an intermediate joint 22.

A spring 23 holds the filter element to its general cylindrical form.

To clean the filter element of any unit, the external cap 16 is removed and a flexible air pipe fitted so as to supply compressed air at a pressure upwards of (say) 30 lbs. per sq. in. The air entrains additional cleaned air and the combined flow from the nozzle impinges on the pleats or fins of the element and causes the vane to circulate round the element and force air through the filter medium to displace any accumulation on the dirty side.

What I claim is:

1. A filter including a cylindrically arranged filtering medium with annular end caps at the ends of the same, the opening in one of said end caps forming a clean air outlet, a closure cap secured to and closing the opening in the other of said end caps, spiders carried by and spanning the openings in said end caps, a hollow spindle freely rotatably supported by said spiders and within the confines of the end caps, said hollow spindle being closed at one end and open at its other end and having a slot intermediate said ends, the open end of the spindle being juxtaposed relative to and slightly spaced from said closure cap, a hollow vane mounted on and communicating with the slot in the hollow spindle, the free end of the hollow vane having an exit opening directed generally tangential to the inner surface of the filtering medium, and means for directing air under pressure through said closure cap and across the slight space into the open end of the hollow spindle and the hollow vane to and through the tangential exit opening, causing the vane to rotate and circulate air to the inner surface of the filtering medium.

2. A filter as defined in claim 1 wherein said spindle is supported by anti-friction bearings carried by said spiders.

3. A filter comprising a cylindrically arranged filtering medium supported between end caps, one of said end caps having a clean air outlet and the other of said caps being closed, a hollow spindle rotatably supported by said caps and provided with a slot, said hollow spindle being closed at one end and open at its other end, the open end of the spindle being supported by and spaced from said closed end cap to provide a gap therebetween, a hollow vane mounted on said spindle and in communication with the slot in the hollow spindle, the free end of the hollow vane having an exit opening directed toward the inner surface of the filtering medium, and means for directing air under pressure through the closed end cap and across the gap into the open end of said spindle to entrain clean air from within said filter and introduce the clean and pressure air into the open end of the hollow spindle and to the hollow vane to direct the air toward the inner surface of and through the filtering medium.

4. A filter as defined in claim 3, wherein the means for directing air under pressure through the closed end cap includes a nozzle in the end cap, the core of which is of less diameter than the inner diameter of the hollow spindle.

5. A filter including a filtering medium, top and bottom end caps at the ends of the filtering medium, the top cap having an outlet for clean air and the bottom cap being normally closed, a hollow rotary spindle supported by the caps, said rotary spindle being closed at the top and open at its lower end and terminating above the normally closed bottom cap to provide a gap therebetween, a hollow vane mounted on and in communication with the hollow rotary spindle and provided at its outer free end with an exit opening directed toward the inner surface of the filtering medium, means for directing air under pressure through the normally closed end cap across the gap into the open end of said spindle to entrain clean air and introduce same to the open end of the hollow rotary spindle and the hollow vane to and through the exit opening to circulate air to the inner surface of the filtering medium.

6. A filter including a filtering medium, top and bottom caps at the ends of the filtering medium, the top cap having an outlet for clean air and the bottom cap being normally closed, a hollow spindle freely rotatably supported by the caps, said rotary spindle being closed at the top and open at its lower end and terminating above the normally closed bottom cap to provide a gap therebetween, a hollow vane mounted on and in communication with the hollow rotary spindle and provided at its outer free end with an exit opening directed generally tangential to the inner surface of the filtering medium, means for directing air under pressure through the normally closed end cap across the gap into the open end of said spindle to entrain clean air and introduce same to the open end of the hollow rotary spindle and the hollow vane to and through the tangential exit opening, causing the vane to rotate and to circulate air to the inner surface of the filtering medium.

7. A filter as defined in claim 6, wherein the means for directing air under pressure through the normally closed bottom cap includes a nozzle in said end cap, the bore of which is of less diameter than the inner diameter of the hollow spindle.

DONALD FRANK RINGE.

REFERENCES CITED

The following references are of record in the file of this patent:

UNITED STATES PATENTS

| Number | Name | Date |
|---|---|---|
| 561,944 | Monnier | June 9, 1896 |
| 2,314,675 | Wilson | Mar. 23, 1943 |
| 2,463,722 | Spraragen | June 15, 1944 |
| 2,534,171 | Kirby | Dec. 12, 1950 |

FOREIGN PATENTS

| Number | Country | Date |
|---|---|---|
| 148,799 | Great Britain | Oct. 10, 1921 |